UNITED STATES PATENT OFFICE.

FRANK A. HEADSON, OF LA FAYETTE, INDIANA.

METALLIC COMPOUND OR COMPOSITION OF MATTER AND PROCESS OF MAKING THE SAME.

933,036.     Specification of Letters Patent.     Patented Aug. 31, 1909.

No Drawing.     Application filed December 28, 1907. Serial No. 408,374.

*To all whom it may concern:*

Be it known that I, FRANK A. HEADSON, a citizen of the United States, residing in La Fayette, county of Tippecanoe, and State of Indiana, have invented certain new and useful Improvements in Metallic Compounds or Compositions of Matter and Processes of Making the Same, of which the following is a specification.

This invention relates to that class of metallic compounds or compositions of matter adapted to be applied to an aperture or apertures, leaks or other openings in metallic vessels or other articles or metallic apparatus, for forming a filler, plug or closure, and to the process of making the same.

The principal object of the invention is to provide a composition of matter or metallic compound adapted to be moistened and allowed to harden, or in fact moistened and allowed to harden, said compound being adapted to be handled, and kept, or transported, in dry, comminuted or powdered form until it is to be used, then moistened and while in the form of a paste applied to an aperture, or apertures, leaks, or other openings in metallic vessels or other metallic articles or apparatus, boilers, pipes, or the like, and allowed to harden and form a liquid or steam tight plug or closure.

The invention consists in the process and metallic compound or composition of matter hereinafter described and claimed.

In making and using my improved compound or composition of matter I provide in pulverized, disintegrated or comminuted form and thoroughly mix in preferably the proportions indicated, the following ingredients or elements: metallic iron, seventy-eight parts; iron sulfate eight parts; calcium sulfate, gypsum or plaster of paris seven parts; hydraulic or Portland cement two parts; graphite or black lead two parts; and preferably also silicate of soda three parts. These are thoroughly mixed while in powdered, pulverized, disintegrated or comminuted form and preferably dry, and the composition of matter thus provided is kept in dry and powdered form until it is to be used. It is then moistened by adding and thoroughly intermixing therewith a sufficient quantity of water to reduce it to the consistency of a paste, and in this form it is inserted or applied to an aperture, leak, joint, or other opening or space to be filled in a metallic vessel, boiler, pipe, or other metallic apparatus, article or part and allowed to harden and become dry, forming an air, water and steam tight plug, seal or closure of sufficient strength to withstand the pressure of steam or other fluid or liquid and prevent the escape thereof. Apertures in metallic plates may thus be effectually closed and metallic articles, and apparatus efficiently mended and rendered fit for use after being damaged, injured or worn. The pipes of boilers may be plugged or mended without removal, and the compound or composition of matter is well adapted for other uses which will be apparent to those versed in the art to which the invention relates.

The above ingredients or elements mixed in the manner and in substantially the proportions above described constitutes or embodies my invention in its preferred form, but I do not confine myself to these exact elements or these exact proportions except as set forth in the claims, and I contemplate the use of equivalents such as may be used without departing from the spirit and nature of my invention as herein described and claimed.

While I prefer to use silicate of soda, it is possible to use other silicates, such, for instance, as sand in lieu thereof, and good results may be obtained from using the other ingredients without either silicate of soda or sand. Calcium oxid or sulfid of iron may be used in lieu of iron sulfate, though I prefer iron sulfate. Calcium oxid may be used instead of hydraulic or Portland cement though I prefer the hydraulic cement. Gum arabic or dextrin or both in combination may be used instead of graphite, though I prefer the latter, and better results are believed to follow using the ingredients or elements in substantially the proportions and mixed and prepared and used in the manner described above in the first instance.

In mixing the ingredients it is necessary to add the comminuted elements first and then the liquid, as described, but the pulverizing and mixing may be accomplished in any ordinary manner so far as the means for disintegrating the material or mixing the parts is concerned. Any desired form of pulverizing or mixing apparatus may be employed, and it is therefore not deemed necessary or desirable to illustrate the apparatus herein.

I claim:

1. The process of making an improved metallic compound or composition of matter which consists in mixing in comminuated, disintegrated or pulverized form metallic iron, iron sulfate, calcium sulfate Portland cement, and graphite, then moistening said elements by adding and thoroughly intermixing therewith a sufficient quantity of liquid to form a paste, and then allowing the composition to harden and become dry.

2. The process of making an improved metallic compound which consists in mixing in comminuted form seventy-eight parts of metallic iron, eight parts of iron sulfate, seven parts of calcium sulfate, three parts of silicate of soda, two parts of hydraulic cement, and two parts of graphite, then adding and intermixing therewith a sufficient quantity of water to form a paste, and then allowing the compound to harden and become dry.

3. The composition of matter forming a metallic compound which comprises metallic iron, iron sulfate, calcium sulfate, hydraulic cement, and graphite all intermixed in comminuted form.

4. The composition of matter forming a metallic compound which comprises seventy-eight parts metallic iron intermixed in comminuted form with iron sulfate, calcium sulfate, hydraulic cement and graphite, all in pulverized or powdered form.

5. The composition of matter which consists of metallic iron, iron sulfate, calcium sulfate, silicate of soda, hydraulic cement, and graphite all intermixed in powdered form.

6. The composition of matter which consists in seventy-eight parts of metallic iron, eight parts of iron sulfate, seven parts of calcium sulfate, intermixed with hydraulic cement and graphite, all in comminuted form.

7. A composition of matter which comprises iron sulfate, calcium sulfate, a heavy body-forming element, and hydraulic cement.

8. A composition of matter which comprises metallic iron, iron sulfate, calcium sulfate, and cement.

9. A composition of matter which comprises metallic iron, iron sulfate, an alkaline silicate, and hydraulic cement.

FRANK A. HEADSON.

Witnesses:
HANNAH MEYER,
HERMAN POTLITZER.